United States Patent
Maeng et al.

(10) Patent No.: US 10,331,886 B2
(45) Date of Patent: Jun. 25, 2019

(54) TOGGLE KEY BLOCKING METHOD FOR DATA SECURITY AND APPARATUS USING THE SAME

(71) Applicant: ELECTRONICS AND TELECOMMUNICATIONS RESEARCH INSTITUTE, Daejeon (KR)

(72) Inventors: YoungJae Maeng, Daejeon (KR); Sang Hun Lee, Daejeon (KR); In Jung Kim, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 293 days.

(21) Appl. No.: 15/389,645

(22) Filed: Dec. 23, 2016

(65) Prior Publication Data
US 2018/0025155 A1 Jan. 25, 2018

(30) Foreign Application Priority Data
Jul. 25, 2016 (KR) .......... 10-2016-0094099

(51) Int. Cl.
G06F 11/00 (2006.01)
G06F 21/55 (2013.01)
G06F 21/83 (2013.01)

(52) U.S. Cl.
CPC .......... *G06F 21/554* (2013.01); *G06F 21/556* (2013.01); *G06F 21/83* (2013.01)

(58) Field of Classification Search
CPC ....... G06F 21/554; G06F 21/83; G06F 21/556
USPC .......................................................... 726/23
See application file for complete search history.

(56) References Cited

U.S. PATENT DOCUMENTS

| | | | |
|---|---|---|---|
| 8,171,546 B2 | 5/2012 | Kim et al. | |
| 9,226,145 B1* | 12/2015 | Loman | .................. H04W 12/12 |
| 2012/0194360 A1* | 8/2012 | Huang | .................. H03M 11/00 341/22 |
| 2015/0346842 A1* | 12/2015 | Ng | ........................ G06F 3/0238 345/172 |

FOREIGN PATENT DOCUMENTS

| | | |
|---|---|---|
| KR | 10-2000-0042458 A | 7/2000 |
| KR | 10-2009-0001313 A | 1/2009 |
| KR | 10-0952644 B1 | 4/2010 |
| KR | 10-2010-0061025 A | 6/2010 |
| KR | 10-2010-0063101 A | 6/2010 |
| KR | 10-1688630 B1 | 12/2016 |

* cited by examiner

*Primary Examiner* — Mohammad W Reza
(74) *Attorney, Agent, or Firm* — LRK Patent Law Firm (57) ABSTRACT

A toggle key blocking method for data security and an apparatus using the same. The toggle key blocking method for data security includes monitoring use of a toggle key on a host with which a keyboard is used, when use of a toggle key on the host is detected, generating details of occurrence of a toggle key event based on a time at which the toggle key event occurred; and blocking use of the toggle key on the host if the host satisfies a toggle key blocking condition based on the details of occurrence of the toggle key event.

20 Claims, 5 Drawing Sheets

TOGGLE KEY BLOCKING METHOD FOR DATA SECURITY AND APPARATUS USING THE SAME

CROSS REFERENCE TO RELATED APPLICATION

This application claims the benefit of Korean Patent Application No. 10-2016-0094099, filed Jul. 25, 2016, which is hereby incorporated by reference in its entirety into this application.

BACKGROUND OF THE INVENTION

1. Technical Field

The present invention relates to toggle key blocking technology for preventing the leakage of data using a keyboard protocol.

2. Description of the Related Art

Since a keyboard is used as an input device, it tends to be incorrectly understood to be a device enabling only the input of information. Generally, when a user presses a key to enter a key signal on a computer (hereinafter referred to as a 'host'), device-to-host communication, that is, communication in the direction from the keyboard to a host, is used in a keyboard protocol.

However, since the keyboard protocol also supports host-to-device communication, that is, communication in the direction from the host to the keyboard, data may also be transmitted from the host to the device. For example, in order to share the states of toggle keys, such as a Caps Lock key, a Num Lock key, and a Scroll Lock key, the computer, which is the host, may transmit data to the keyboard, which is the device.

Therefore, when a toggle key, the state of which is shared between the computer and the keyboard, is applied, it is possible to output data using a standard keyboard interface and a keyboard protocol. Further, when this method is abused, data may be extracted even from a computer on which a media control system is installed, and thus this method may be a vector for a fatal attack in a security-sensitive environment.

PRIOR ART DOCUMENTS

Patent Documents (Patent Document 1) Korean Patent No. 10-0952644 (Date of Registration: Apr. 6, 2010, entitled "Security System and Method of Keyboard Input Data")

SUMMARY OF THE INVENTION

Accordingly, the present invention has been made keeping in mind the above problems occurring in the prior art, and an object of the present invention is to provide a method that is capable of responding to an attack intended to leak data from a computer by abusing a keyboard protocol.

Another object of the present invention is to prevent vulnerabilities that may commonly occur in all terminals with which keyboards are used.

In accordance with an aspect of the present invention to accomplish the above objects, there is provided a toggle key blocking method for data security, including monitoring use of a toggle key on a host with which a keyboard is used; when use of a toggle key on the host is detected, generating details of occurrence of a toggle key event based on a time at which the toggle key event occurred; and blocking use of the toggle key on the host if the host satisfies a toggle key blocking condition based on the details of occurrence of the toggle key event.

Blocking the use of the toggle key may be configured to set a current time to a time at which the toggle key event first occurred, and to determine that the host satisfies the toggle key blocking condition when a number of occurrences of the toggle key event during a preset detection period from the current time is greater than a preset number of occurrences.

Blocking the use of the toggle key may be configured to, when a subsequent toggle key event occurs after the preset detection period from the current time has passed, reset the current time to a time at which the subsequent toggle key event occurs after the preset detection period has passed.

Blocking the use of the toggle key may be configured to initialize the number of occurrences of the toggle key event to '0' when the current time is reset.

Monitoring the use of the toggle key may be configured to monitor toggle key data transmitted from the host at a level of a keyboard driver to the keyboard.

Monitoring the use of the toggle key may be configured to monitor the use of the toggle key by utilizing a function for checking a state of the toggle key at preset periods.

Monitoring the use of the toggle key may be configured to monitor a keyboard event occurring on the host based on Dynamic Link Library (DLL) hooking.

Monitoring the use of the toggle key may be configured to monitor toggle key data transmitted from the host at a level of a keyboard controller provided in the host to the keyboard.

Blocking the use of the toggle key may be configured to block the use of the toggle key by dropping the toggle key event.

Blocking the use of the toggle key may be configured to, when it is impossible to drop the toggle key event, create noise for the toggle key event by generating an arbitrary toggle key event.

In accordance with another aspect of the present invention to accomplish the above objects, there is provided a toggle key blocking apparatus for data security, including a monitoring unit for monitoring use of a toggle key on a host with which a keyboard is used; a detection unit for, when use of a toggle key on the host is detected, generating details of occurrence of a toggle key event based on a time at which the toggle key event occurred; and a blocking unit for blocking the use of the toggle key on the host if the host satisfies a toggle key blocking condition based on the details of occurrence of the toggle key event.

The blocking unit may be configured to set a current time to a time at which the toggle key event first occurred, and to determine that the host satisfies the toggle key blocking condition when a number of occurrences of the toggle key event during a preset detection period from the current time is greater than a preset number of occurrences.

The blocking unit may be configured to, when a subsequent toggle key event occurs after the preset detection period from the current time has passed, reset the current time to a time at which the subsequent toggle key event occurs after the preset detection period has passed.

The blocking unit may be configured to initialize the number of occurrences of the toggle key event to '0' when the current time is reset.

The monitoring unit may be configured to monitor toggle key data transmitted from the host at a level of a keyboard driver to the keyboard.

The monitoring unit may be configured to monitor the use of the toggle key by utilizing a function for checking a state of the toggle key at preset periods.

The monitoring unit may be configured to monitor a keyboard event occurring on the host based on Dynamic Link Library (DLL) hooking.

The monitoring unit may be configured to monitor toggle key data transmitted from the host at a level of a keyboard controller provided in the host to the keyboard.

The blocking unit may be configured to block the use of the toggle key by dropping the toggle key event.

The blocking unit may be configured to, when it is impossible to drop the toggle key event, create noise for the toggle key event by generating an arbitrary toggle key event.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Hereinafter, preferred embodiments of the present invention will be described in detail with reference to the attached drawings.

Figure 1:
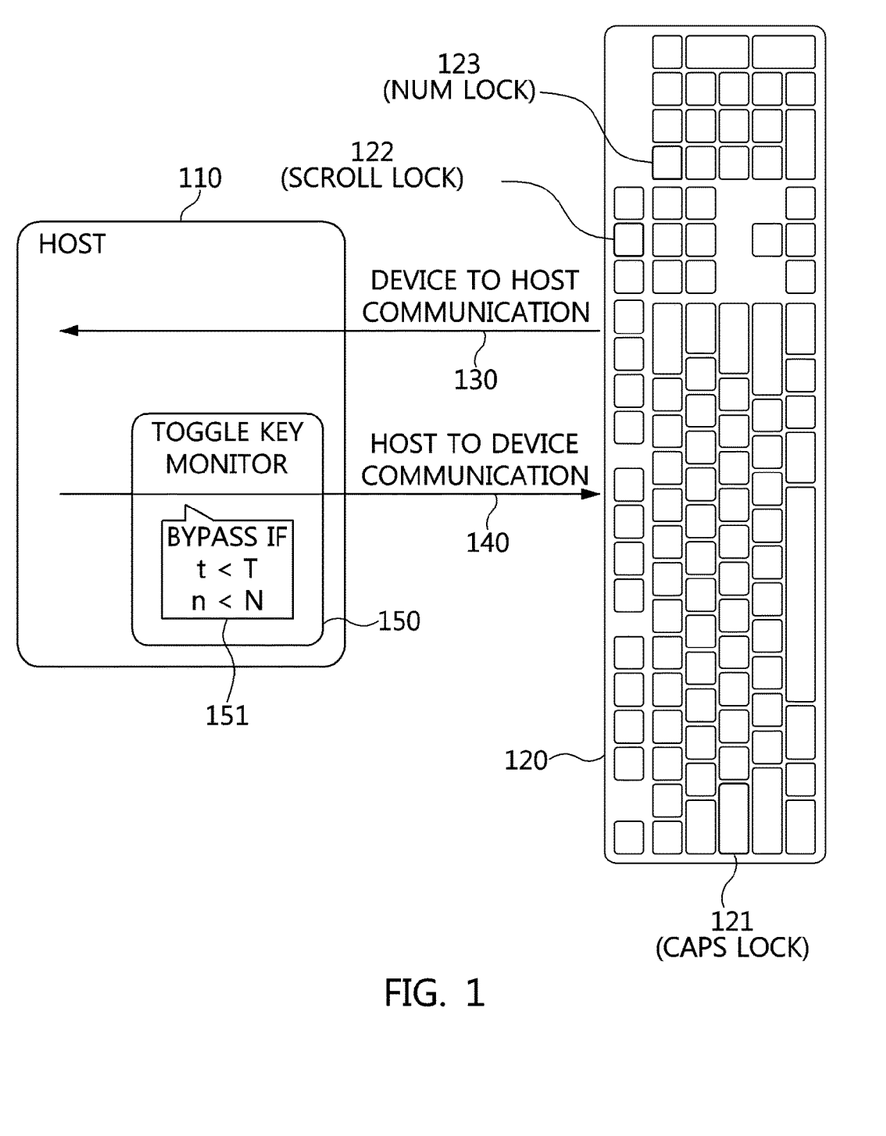
FIG. 1 is a diagram showing a toggle key blocking system for data security according to an embodiment of the present invention.

FIG. 1 is a diagram showing a toggle key blocking system for data security according to an embodiment of the present invention.

Referring to FIG. 1, the toggle key blocking system for data security according to the embodiment of the present invention includes a computer 110, which is a host, a keyboard 120, which is a device, and a toggle key monitoring module 150.

Here, the keyboard 120 may be the device that is operated with the keyboard 120 connected to the computer 110, and the computer 110 and the keyboard 120 may both perform device-to-host communication 130 and host-to-device communication 140 based on a keyboard protocol. That is, a key value input by the user using the keyboard 120 may be converted into some data format and then the data may be transmitted to the computer 110. Conversely, data may be transmitted from the computer 110 to the keyboard 120.

In this case, data received through host-to-device communication 140 may be toggle key data. For example, as shown in FIG. 1, toggle keys 121, 122, and 123 may respectively be a Caps Lock key, a Scroll Lock key, and a Num Lock key. Here, the term "toggle key" denotes a key capable of switching between two states merely by pressing the corresponding key.

Such toggle keys 121, 122, and 123 may be pressed even on the computer 110, which is the host. Therefore, when an input event corresponding to the toggle key 121, 122 or 123 occurs on the computer 110, the computer 110 may transmit toggle key data to the keyboard 120 based on host-to-device communication 140 in order to share the state of the toggle key with the keyboard 120.

In this case, data transmitted from the computer 110 to the keyboard 120 based on the keyboard protocol cannot be detected and controlled even by a media control system installed on the computer 110. Therefore, when such data is abused, an attack method using the abused data may be a fatal attack method.

Therefore, the present invention may solve the above problem by monitoring the host-to-device communication 140 directed from the computer 110 to the keyboard 120 using the toggle key monitoring module 150.

The toggle key monitoring module 150 may be a toggle key blocking apparatus according to the present invention. The toggle key monitoring module 150 may be located either inside the host, as shown in FIG. 1, or outside the host. If the toggle key monitoring module 150 is located outside the host, authority to access a keyboard driver or a keyboard controller corresponding to the host may be granted to the toggle key monitoring module 150.

Here, the toggle key monitoring module 150 monitors host-to-device communication 140 based on a toggle key blocking condition 151. When an action that satisfies the toggle key blocking condition 151 is taken on the computer 110, the use of a toggle key on the computer 110 may be blocked so as to block host-to-device communication 140.

In this case, the toggle key monitoring module 150 or the toggle key blocking apparatus may block the use of a toggle key on the computer 110 using a method based on software or hardware.

Figure 2:
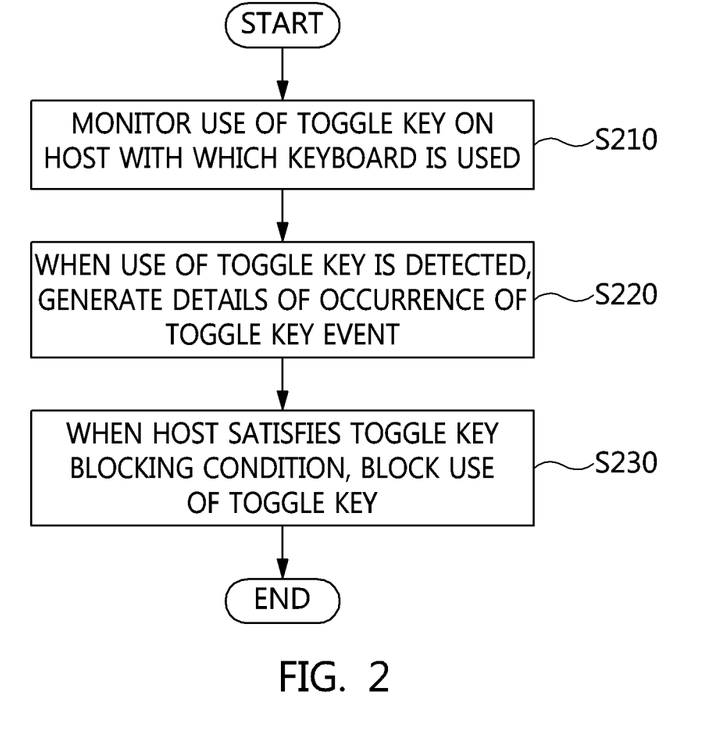
FIG. 2 is an operation flowchart showing a toggle key blocking method for data security according to an embodiment of the present invention.

FIG. 2 is an operation flowchart showing a toggle key blocking method for data security according to an embodiment of the present invention.

Referring to FIG. 2, the toggle key blocking method for data security according to the embodiment of the present invention monitors the use of a toggle key on a host with which a keyboard is used at step S210.

Here, the toggle key may be a key, having only two states (values), on the keyboard. That is, the toggle key may mean that, when the toggle key is pressed once, it has one value, and when the toggle key is pressed once more, the value of the key changes to the other value. For example, a Caps Lock key, a Num Lock key, a Scroll Lock key, a Korean/English (KOR/ENG) conversion key, and an Insert key may correspond to toggle keys.

Here, toggle keys may be directly pressed on the computer, that is, the host, connected to the keyboard, as well as the keyboard. Therefore, when any toggle key is pressed on the host, an error may not be present at the time of pressing a subsequent key only when the state of the toggle key is shared with the keyboard. In this case, the keyboard protocol may support host-to-device communication, thus enabling the computer, which is the host, to transmit data to the keyboard, which is the device.

However, a media control system installed on the computer cannot control the output of data to the device using a standard keyboard interface and a standard keyboard protocol. Therefore, communication through which the host transmits data to the device, as in the case of sharing toggle key data, may be used as a fatal attack method in a security-sensitive environment.

In order to prevent such a problem, the present invention may monitor the use of a toggle key on the host.

Here, toggle key data transmitted from the host at the level of the keyboard driver to the keyboard may be monitored. That is, when an input event for a toggle key occurs on the host, the keyboard driver provides a key value corresponding to the input event, and thus the use of the toggle key may be immediately detected by monitoring the key value.

In this case, the use of a toggle key may be monitored by utilizing a function for checking the state of the toggle key at preset periods. For example, the use of a toggle key may be monitored by utilizing a function such as GetAsyncKeyState( ) or GetKeyState( ). The function GetAsyncKeyState( ) may be utilized to check the state of a pressed key at the time the function is called, regardless of a message queue, and GetKeyState( ) may be used to check the state of a key when a message occurs based on messages stored in the message queue.

Further, a keyboard event occurring on the host may be monitored based on Dynamic Link Library (DLL) hooking. That is, the event corresponding to a keyboard input, which occurs in response to pressing of a key on the host, may be hooked and then whether the corresponding event is an event for the pressing of a toggle key may be checked.

Further, toggle key data transmitted from the host at the level of the keyboard controller provided in the host to the keyboard may also be monitored. In this case, the keyboard controller may be installed on the main board of the computer, and key input information may be recorded through a keyboard input/output port. Therefore, when the toggle key is pressed on the host, the keyboard controller may monitor the occurrence of toggle key data before data is transmitted to the keyboard through the keyboard input/output port.

Furthermore, when the use of the toggle key on the host is detected, the toggle key blocking method for data security according to the embodiment of the present invention generates details of the occurrence of a toggle key event based on the time at which the toggle key event occurred at step S220.

Here, the toggle key event occurrence details may include information about the time at which the toggle key event occurred and the number of occurrences of the toggle key event, based on the time at which the occurrence of the toggle key event was monitored. For example, in the case of the Caps Lock key, the time at which an event occurred may be stored as t[caps], and the number of occurrences of the event may be stored as n[caps].

Furthermore, the toggle key blocking method for data security according to the embodiment of the present invention blocks the use of a toggle key on the host when the host satisfies a toggle key blocking condition based on the toggle key event occurrence details at step S230.

Here, the time at which the toggle key event first occurred is set as the current time. When the number of occurrences of the toggle key event during a preset detection period from the current time is greater than the preset number of occurrences, it may be determined that the host has satisfied the toggle key blocking condition.

Generally, since the state value of each toggle key changes in response to the pressing of the toggle key, the case where the same toggle key is successively pressed may seldom occur. Further, the case where toggle keys are successively pressed seldom occurs even if the toggle keys are not of the same type. Therefore, if the successive pressing of toggle keys is detected, the corresponding pressing action is determined to be an illegal action performed with the intention of leaking data from the host, and the use of a toggle key on the host may be blocked.

For example, it may be assumed that a preset detection period is 30 seconds, that the preset number of occurrences is 10, and that the time at which a toggle key event first occurred is 1:01:00 p.m. In this case, if the toggle key event occurs more than 10 times during the preset detection period of 30 seconds ranging from the current time of 1:01:00 p.m. to the time of 1:01:30 p.m., the host is determined to satisfy the toggle key blocking condition, and thus the use of a toggle key on the host may be blocked.

After the preset detection period from the current time has passed, if a subsequent toggle key event occurs, the current time may be reset to the time at which the subsequent toggle key event occurs after the passage of the preset detection period.

In the above example, if it is assumed that, after a toggle key event first occurred at 1:01 p.m., a second toggle key event occurs at 1:02 p.m., which is a time after the preset detection period of 30 seconds has passed, the current time may be reset to 1:02 p.m.

When the current time has been reset, the number of occurrences of the toggle key event may be initialized to '0'. That is, since the current time, which is one criterion for determining whether the host satisfies the toggle key blocking condition, has been reset, the number of occurrences of the toggle key event, which is another criterion for determining whether the host has satisfied the toggle key blocking condition, may also be initialized to '0'.

Here, although the number of occurrences of the toggle key event has been initialized to '0' in the present invention, it is also possible to determine that a toggle key event occurs at a time corresponding to the current time, and to initialize the number of occurrences of the toggle key event in this case to '1'.

Here, the use of the toggle key may be blocked by dropping a toggle key event. In this case, the use of the toggle key may be blocked at at least one of the levels of the keyboard driver and the keyboard controller provided in the host. That is, before data about a toggle key event is transmitted to the device, the host may prevent data from being transmitted by dropping the corresponding event using one of a software method and a hardware method.

Further, data may be prevented from being transmitted to the device by hooking a toggle key event through DLL hooking.

When it is impossible to drop a certain toggle key event, an arbitrary toggle key event is intentionally generated, and thus noise for the certain toggle key event may be created. In other words, if it is impossible to block the transmission of data by directly dropping the toggle key event, an error may be caused during data transmission by intentionally creating noise.

Although not shown in FIG. 2, the toggle key blocking method for data security according to the embodiment of the present invention stores various types of information generated during a toggle key blocking procedure according to the embodiment of the present invention, as described above.

By means of such a toggle key blocking method, there may be provided a method that is capable of responding to an attack intended to leak data from the computer by abusing a keyboard protocol.

Furthermore, the present invention may prevent vulnerabilities that may commonly occur in all terminals with which keyboards are used.

Figure 3:
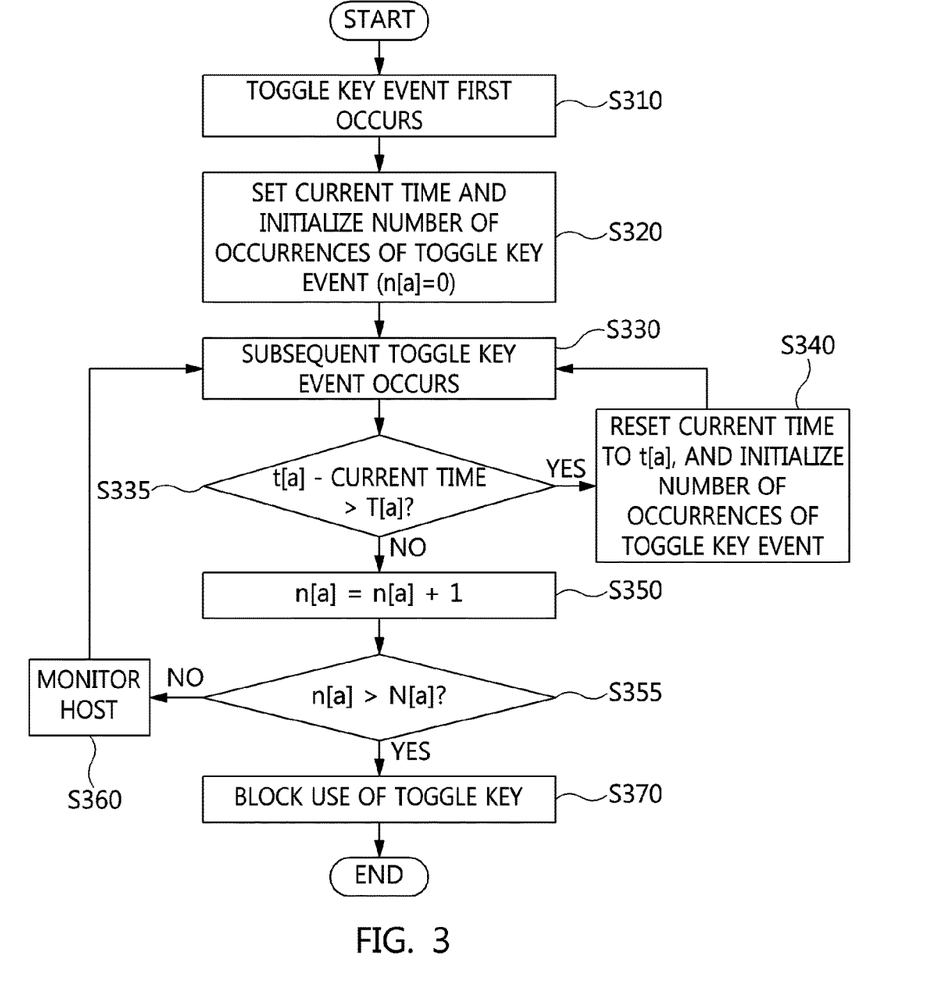
FIG. 3 is an operation flowchart showing in detail a procedure for determining whether to block a toggle key in the toggle key blocking method according to an embodiment of the present invention.

FIG. 3 is an operation flowchart showing in detail the procedure for determining whether to block a toggle key in the toggle key blocking method according to an embodiment of the present invention.

Referring to FIG. 3, in the procedure for determining whether to block a toggle key in the toggle key blocking method according to the embodiment of the present invention, when it is detected that a toggle key event has first occurred at step S310, the time at which the toggle key event first occurred may be set as the current time, and the number of occurrences of the toggle key event may be initialized at step S320.

For example, the current time may be set to the time at which the toggle key event first occurred, and the number of occurrences of the toggle key event, that is, n[a], may be initialized to '0'.

Thereafter, when a subsequent toggle key event occurs at step S330, it may be determined whether a value obtained by subtracting the current time from the time t[a] at which the subsequent toggle key event occurs is greater than a preset detection period T[a] at step S335. That is, it may be determined whether the subsequent toggle key event has occurred during the preset detection period.

If it is determined at step S335 that the value obtained by subtracting the current time from t[a] is greater than T[a], it may be determined that the subsequent toggle key event has occurred after the passage of the preset detection period, the current time may be reset to t[a], and the number of occurrences of the toggle key event may be initialized at step S340. Thereafter, the occurrence of a toggle key event may be detected.

Further, if it is determined at step S335 that the value obtained by subtracting the current time from t[a] is not greater than T[a], it may be determined that the subsequent toggle key event has occurred during the preset detection period, and the number of occurrences of the toggle key event, that is, n[a], may be increased by at step S350.

Thereafter, it may be determined whether the number of occurrences of the toggle key event n[a] is greater than the preset number of occurrences N[a] at step S355.

If it is determined at step S355 that n[a] is not greater than N[a], the host may be continuously monitored at step S360.

On the other hand, if it is determined at step S355 that n[a] is greater than N[a], it is determined that the host satisfies the toggle key blocking condition, and the use of a toggle key on the host may be blocked at step S370.

Figure 4:
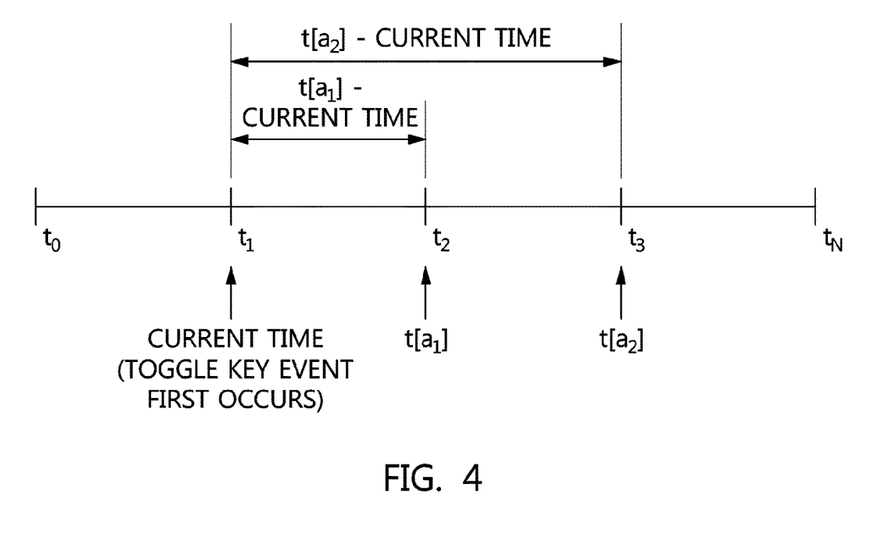
FIG. 4 is a diagram showing an example of a current time reset procedure according to the present invention.

FIG. 4 is a diagram showing an example of a procedure for resetting the current time according to the present invention.

Referring to FIG. 4, the current time $t_1$ according to the present invention may be the time at which a toggle key event first occurred.

Referring to FIG. 4, it can be seen that a toggle key event corresponding to $a_1$ occurred at time $t_2$, and a toggle key event corresponding to $a_2$ occurred at time $t_3$.

For example, when a preset detection period is assumed to be a period from the current time $t_1$ to a certain time between time $t_2$ and time $t_3$, the current time may not be reset when the toggle key event corresponding to $a_1$ occurs.

That is, since a value obtained by subtracting the current time from $t[a_1]$, as shown in FIG. 4, is less than the preset detection period, it may be determined only whether to block the use of a toggle key by comparing the number of occurrences of the toggle key event with the preset number of occurrences.

However, when the toggle key event corresponding to $a_2$ occurs, a value obtained by subtracting the current time from $t[a_2]$, as shown in FIG. 4, is greater than the preset detection period, and thus the current time may be newly reset to time $t_3$.

Further, as the current time is reset to time $t_3$, the number of occurrences of the toggle key event may also be initialized.

Figure 5:
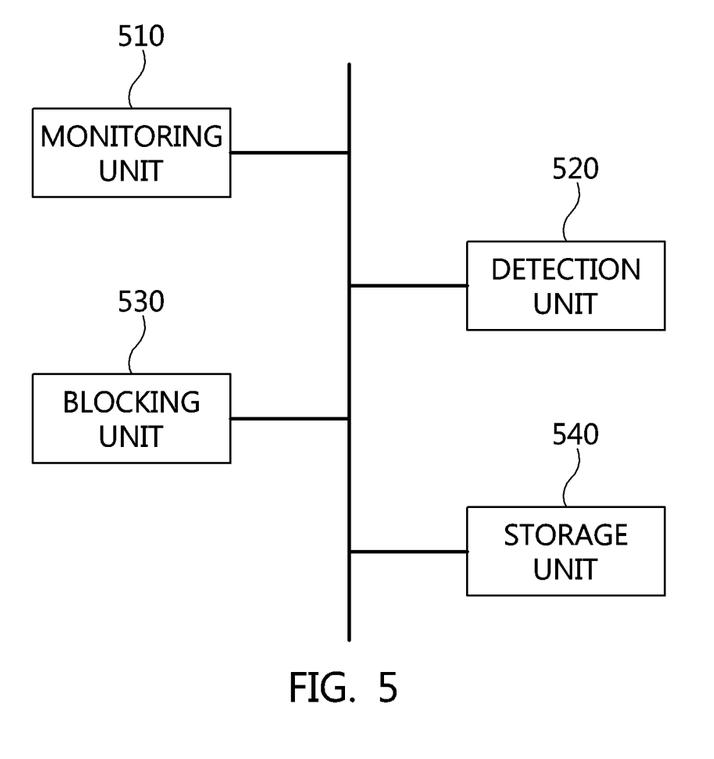
FIG. 5 is a block diagram showing a toggle key blocking apparatus for data security according to an embodiment of the present invention.

FIG. 5 is a block diagram showing a toggle key blocking apparatus for data security according to an embodiment of the present invention.

Referring to FIG. 5, the toggle key blocking apparatus for data security according to the embodiment of the present invention includes a monitoring unit 510, a detection unit 520, a blocking unit 530, and a storage unit 540.

The monitoring unit 510 monitors the use of a toggle key on a host with which a keyboard is used.

Here, the toggle key may be a key, having only two states (values), on the keyboard. That is, the toggle key may mean that, when the toggle key is pressed once, it has one value, and when the toggle key is pressed once more, the value of the key changes to the other value. For example, a Caps Lock key, a Num Lock key, a Scroll Lock key, a Korean/English (KOR/ENG) conversion key, and an Insert key may correspond to toggle keys.

Here, toggle keys may be directly pressed on the computer, that is, the host, connected to the keyboard, as well as the keyboard. Therefore, when any toggle key is pressed on the host, an error may not be present at the time of pressing a subsequent key only when the state of the toggle key is shared with the keyboard. In this case, the keyboard protocol may support host-to-device communication, thus enabling the computer, which is the host, to transmit data to the keyboard, which is the device.

However, a media control system installed on the computer cannot control the output of data to the device using a standard keyboard interface and a standard keyboard protocol. Therefore, communication through which the host transmits data to the device, as in the case of sharing toggle key data, may be used as a fatal attack method in a security-sensitive environment.

In order to prevent such a problem, the present invention may monitor the use of a toggle key on the host.

Here, toggle key data transmitted from the host at the level of the keyboard driver to the keyboard may be monitored. That is, when an input event for a toggle key occurs on the host, the keyboard driver provides a key value corresponding to the input event, and thus the use of the toggle key may be immediately detected by monitoring the key value.

In this case, the use of a toggle key may be monitored by utilizing a function for checking the state of the toggle key at preset periods. For example, the use of a toggle key may be monitored by utilizing a function such as GetAsyncKeyState( ) or GetKeyState( ). The function GetAsyncKeyState( ) may be utilized to check the state of a pressed key at the time the function is called, regardless of a message queue, and GetKeyState( ) may be used to check the state of a key when a message occurs based on messages stored in the message queue.

Further, a keyboard event occurring on the host may be monitored based on Dynamic Link Library (DLL) hooking. That is, the event corresponding to a keyboard input, which occurs in response to pressing of a key on the host, may be hooked and then whether the corresponding event is an event for the pressing of a toggle key may be checked.

Further, toggle key data transmitted from the host at the level of the keyboard controller provided in the host to the keyboard may also be monitored. In this case, the keyboard controller may be installed on the main board of the computer, and key input information may be recorded through a keyboard input/output port. Therefore, when the toggle key is pressed on the host, the keyboard controller may monitor the occurrence of toggle key data before data is transmitted to the keyboard through the keyboard input/output port.

When the use of a toggle key on the host is detected, the detection unit 520 generates details of the occurrence of a toggle key event based on the time at which the toggle key event occurred.

Here, the toggle key event occurrence details may include information about the time at which the toggle key event occurred and the number of occurrences of the toggle key event, based on the time at which the occurrence of the toggle key event was monitored. For example, in the case of the Caps Lock key, the time at which an event occurred may be stored as t[caps], and the number of occurrences of the event may be stored as n[caps].

When the host satisfies a toggle key blocking condition based on the toggle key event occurrence details, the blocking unit 530 blocks the use of a toggle key on the host.

Here, the time at which the toggle key event first occurred is set as the current time. When the number of occurrences of the toggle key event during a preset detection period from the current time is greater than the preset number of occurrences, it may be determined that the host has satisfied the toggle key blocking condition.

Generally, since the state value of each toggle key changes in response to the pressing of the toggle key, the case where the same toggle key is successively pressed may seldom occur. Further, the case where toggle keys are successively pressed seldom occurs even if the toggle keys are not of the same type. Therefore, if the successive pressing of toggle keys is detected, the corresponding pressing action is determined to be an illegal action performed with the intention of leaking data from the host, and the use of a toggle key on the host may be blocked.

For example, it may be assumed that a preset detection period is 30 seconds, that the preset number of occurrences is 10, and that the time at which a toggle key event first occurred is 1:01:00 p.m. In this case, if the toggle key event occurs more than 10 times during the preset detection period of 30 seconds ranging from the current time of 1:01:00 p.m. to the time of 1:01:30 p.m., the host is determined to satisfy the toggle key blocking condition, and thus the use of a toggle key on the host may be blocked.

After the preset detection period from the current time has passed, if a subsequent toggle key event occurs, the current time may be reset to the time at which the subsequent toggle key event occurs after the passage of the preset detection period.

In the above example, if it is assumed that, after a toggle key event first occurred at 1:01 p.m., a second toggle key event occurs at 1:02 p.m., which is a time after the preset detection period of 30 seconds has passed, the current time may be reset to 1:02 p.m.

When the current time has been reset, the number of occurrences of the toggle key event may be initialized to '0'. That is, since the current time, which is one criterion for determining whether the host satisfies the toggle key blocking condition, has been reset, the number of occurrences of the toggle key event, which is another criterion for determining whether the host has satisfied the toggle key blocking condition, may also be initialized to '0'.

Here, although the number of occurrences of the toggle key event has been initialized to '0' in the present invention, it is also possible to determine that a toggle key event occurs at a time corresponding to the current time, and to initialize the number of occurrences of the toggle key event in this case to '1'.

Here, the use of the toggle key may be blocked by dropping a toggle key event. In this case, the use of the toggle key may be blocked at at least one of the levels of the keyboard driver and the keyboard controller provided in the host. That is, before data about a toggle key event is transmitted to the device, the host may prevent data from being transmitted by dropping the corresponding event using one of a software method and a hardware method.

Further, data may be prevented from being transmitted to the device by hooking a toggle key event through DLL hooking.

When it is impossible to drop a certain toggle key event, an arbitrary toggle key event is intentionally generated, and thus noise for the certain toggle key event may be created. In other words, if it is impossible to block the transmission of data by directly dropping the toggle key event, an error may be caused during data transmission by intentionally creating noise.

The storage unit 540 stores various types of information generated during a toggle key blocking procedure according to an embodiment of the present invention, as described above.

In an embodiment, the storage unit 540 may be configured independently of the toggle key blocking apparatus to support a function of blocking a toggle key. Here, the storage unit 540 may function as separate large-capacity storage and may include a control function for performing operations.

Meanwhile, the toggle key blocking apparatus may be equipped with memory, and may store information therein. In an embodiment, the memory is a computer-readable medium. In an embodiment, the memory may be a volatile memory unit, and in another embodiment, the memory may be a nonvolatile memory unit. In an embodiment, a storage device is a computer-readable medium. In various different embodiments, the storage device may include, for example, a hard disk device, an optical disk device or any other type of storage device.

By utilizing the toggle key blocking apparatus, the present invention may provide a method that is capable of responding to an attack intended to leak data from a computer by abusing a keyboard protocol.

Further, the present invention may prevent vulnerabilities that may commonly occur in all terminals with which keyboards are used.

As described above, the present invention is advantageous in that it is possible to provide a method that is capable of responding to an attack intended to leak data from a computer by abusing a keyboard protocol.

Further, the present invention is advantageous in that it is possible to prevent vulnerabilities that may commonly occur in all terminals with which keyboards are used.

As described above, in the toggle key blocking method for data security and the apparatus using the method according to the present invention, the configurations and schemes in the above-described embodiments are not limitedly applied, and some or all of the above embodiments can be selectively combined and configured so that various modifications are possible.

What is claimed is:

1. A toggle key blocking method for data security, comprising:
   monitoring use of a toggle key on a host with which a keyboard is used;
   in response to detection of data of a toggle key, the detected data being transmitted both directions from the host to the keyboard and from the keyboard to the host, generating details of occurrence of a toggle key event based on a predetermined time at which the toggle key event occurred; and
   blocking use of the toggle key on the host in response to determination of the host satisfying a toggle key blocking condition, the condition being determined based on the details of occurrence of the toggle key event during the predetermined time.

2. The toggle key blocking method of claim 1, wherein
   the toggle key blocking condition is determined by setting a current time to a time at which the toggle key event first occurred, and
   determining whether the host satisfying the toggle key blocking condition,
   in response to detection of a number of occurrences of the toggle key event during a preset detection period from the current time is greater than a preset number of occurrences,
   blocking use of toggle key.

3. The toggle key blocking method of claim 2, wherein
   in response to detection of a subsequent toggle key event being occurred subsequent to the preset detection period from the current time having been passed,
   resetting the current time to a time at which the subsequent toggle key event being occurred.

4. The toggle key blocking method of claim 3, further comprising:
   initializing the number of occurrences of the toggle key event to '0' in response to detection of the current time being reset.

5. The toggle key blocking method of claim 1, further comprising:
   monitoring toggle key data transmitted from the host at a level of a keyboard driver to the keyboard.

6. The toggle key blocking method of claim 5, further comprising:
   monitoring the use of the toggle key by utilizing a functional algorithm according to keyboard protocol at preset periods for checking a state of the toggle key.

7. The toggle key blocking method of claim 5, further comprising:
   monitoring a keyboard event occurring on the host based on Dynamic Link Library (DLL) hooking.

8. The toggle key blocking method of claim 1, further comprising:
   monitoring toggle key data transmitted from the host at a level of a keyboard controller provided in the host to the keyboard.

9. The toggle key blocking method of claim 2, further comprising:
   blocking the use of the toggle key by dropping the toggle key event.

10. The toggle key blocking method of claim 9, further comprising:
    in response to detection of dropping the toggle key event being failed, creating noise for the toggle key event by generating an arbitrary toggle key event.

11. A toggle key blocking apparatus for data security, comprising:
    a monitoring unit configured to monitor data of a toggle key, the detected data being transmitted both directions from a host to a keyboard and from the keyboard to the host;
    in response to detection of use of a toggle key on the host is detected, a detection unit is configured to generate details of occurrence of a toggle key event based on a predetermined time at which the toggle key event occurred; and
    a blocking unit configured to block the use of the toggle key on the host in response to determination of the host satisfying a toggle key blocking condition, the condition being determined based on the details of occurrence of the toggle key event during the predetermined time.

12. The toggle key blocking apparatus of claim 11, wherein
    the blocking unit is configured to set a current time to a time at which the toggle key event first occurred, and to determine whether the host satisfying the toggle key blocking condition,
    in response to detection of a number of occurrences of the toggle key event during a preset detection period from the current time is greater than a preset number of occurrence,
    the blocking unit is configured to block the use of toggle key.

13. The toggle key blocking apparatus of claim 12, wherein
    in response to detection of a subsequent toggle key event being occurred subsequent to the preset detection period from the current time having been passed, the blocking unit is configured to reset the current time to a time at which the subsequent toggle key event being occurred.

14. The toggle key blocking apparatus of claim 13, wherein the blocking unit is configured to initialize the number of occurrences of the toggle key event to '0' in response to detection of the current time being reset.

15. The toggle key blocking apparatus of claim 11, wherein the monitoring unit is configured to monitor toggle key data transmitted from the host at a level of a keyboard driver to the keyboard.

16. The toggle key blocking apparatus of claim 15, wherein the monitoring unit is configured to monitor the use of the toggle key by utilizing a functional algorithm according to keyboard protocol at preset periods to check a state of the toggle key.

17. The toggle key blocking apparatus of claim 15, wherein the monitoring unit is configured to monitor a keyboard event occurring on the host based on Dynamic Link Library (DLL) hooking.

18. The toggle key blocking apparatus of claim 11, wherein the monitoring unit is configured to monitor toggle key data transmitted from the host at a level of a keyboard controller provided in the host to the keyboard.

19. The toggle key blocking apparatus of claim 12, wherein the blocking unit is configured to block the use of the toggle key by dropping the toggle key event.

20. The toggle key blocking apparatus of claim 19, wherein in response to detection of dropping the toggle key event being failed, the blocking unit is configured to create noise for the toggle key event by generating an arbitrary toggle key event.

* * * * *